(12) United States Patent
Carson et al.

(10) Patent No.: US 9,371,020 B2
(45) Date of Patent: Jun. 21, 2016

(54) MOVEABLE STATION POLE FOR A WHEEL CHAIR POSITION IN A TRANSIT BUS

(71) Applicants: Dale Elliott Carson, Murrieta, CA (US); Bradley Dean Carson, Menifee, CA (US); Macy Masoud Neshati, Murrieta, CA (US)

(72) Inventors: Dale Elliott Carson, Murrieta, CA (US); Bradley Dean Carson, Menifee, CA (US); Macy Masoud Neshati, Murrieta, CA (US)

( * ) Notice: Subject to any disclaimer, the term of this patent is extended or adjusted under 35 U.S.C. 154(b) by 0 days.

(21) Appl. No.: 14/449,082

(22) Filed: Jul. 31, 2014

(65) Prior Publication Data
US 2016/0031344 A1    Feb. 4, 2016

(51) Int. Cl.
*B60N 2/30* (2006.01)
*B62D 31/02* (2006.01)
*B60N 2/24* (2006.01)

(52) U.S. Cl.
CPC .............. *B60N 2/3043* (2013.01); *B60N 2/242* (2013.01); *B60N 2/305* (2013.01); *B62D 31/02* (2013.01)

(58) Field of Classification Search
CPC ........ A47C 9/06; B60N 2/305; B60N 2/3043; B60N 2/242; B60N 31/02; B60N 2/30; B60N 2/24
USPC ................ 297/14, 331, 334, 217.7, 278, 281; 296/65.04, 65.05
See application file for complete search history.

(56) References Cited

U.S. PATENT DOCUMENTS

| 3,131,964 | A  | * | 5/1964  | Reed ......................... B60N 2/38 248/240 |
| 4,167,285 | A  |   | 9/1979  | Fenner et al. |
| 4,744,536 | A  |   | 5/1988  | Bancalari |
| 5,492,389 | A  | * | 2/1996  | McClintock et al. ........... 297/14 |
| 5,816,646 | A  | * | 10/1998 | Combest ................... B60P 3/36 135/88.1 |
| 6,209,943 | B1 | * | 4/2001  | Neale et al. ................ 296/65.01 |
| 7,438,354 | B2 | * | 10/2008 | Moffa et al. .................... 297/14 |
| 7,954,873 | B2 | * | 6/2011  | Abe et al. ................... 296/65.05 |
| 8,469,431 | B2 |   | 6/2013  | Andersson |
| 9,061,612 | B2 | * | 6/2015  | de Bijl et al. |
| 2014/0346825 | A1 | * | 11/2014 | Mill ..................... A61G 3/0808 297/232 |

FOREIGN PATENT DOCUMENTS

WO         WO 0143594 A1 *  6/2001

* cited by examiner

*Primary Examiner* — Milton Nelson, Jr.
(74) *Attorney, Agent, or Firm* — Kirk A. Buhler; Buhler & Associates

(57) ABSTRACT

Improvements in a moveable stanchion pole for a wheel chair position in a transit bus to provide a connection to a seat or bench. The seat is pivotably secured to a side wall of the transportation vehicle. The pole rotates and or pivots as the seat or bench is moved. The stanchion pole allows a person to hold onto the pole while they are standing. When the pole is rotated the pole rotates to provide clearance to the area. The stanchion pole is connected to the front of the chair and lifts the stanchion pole as the chair is rotated. This requires the stanchion pole to both hinge and rotate with the bench. The movement of the chair and pole clears the occupied space of the seat and stanchion pole to allow for a wheelchair to occupy the same place where the chair previously existed.

19 Claims, 3 Drawing Sheets

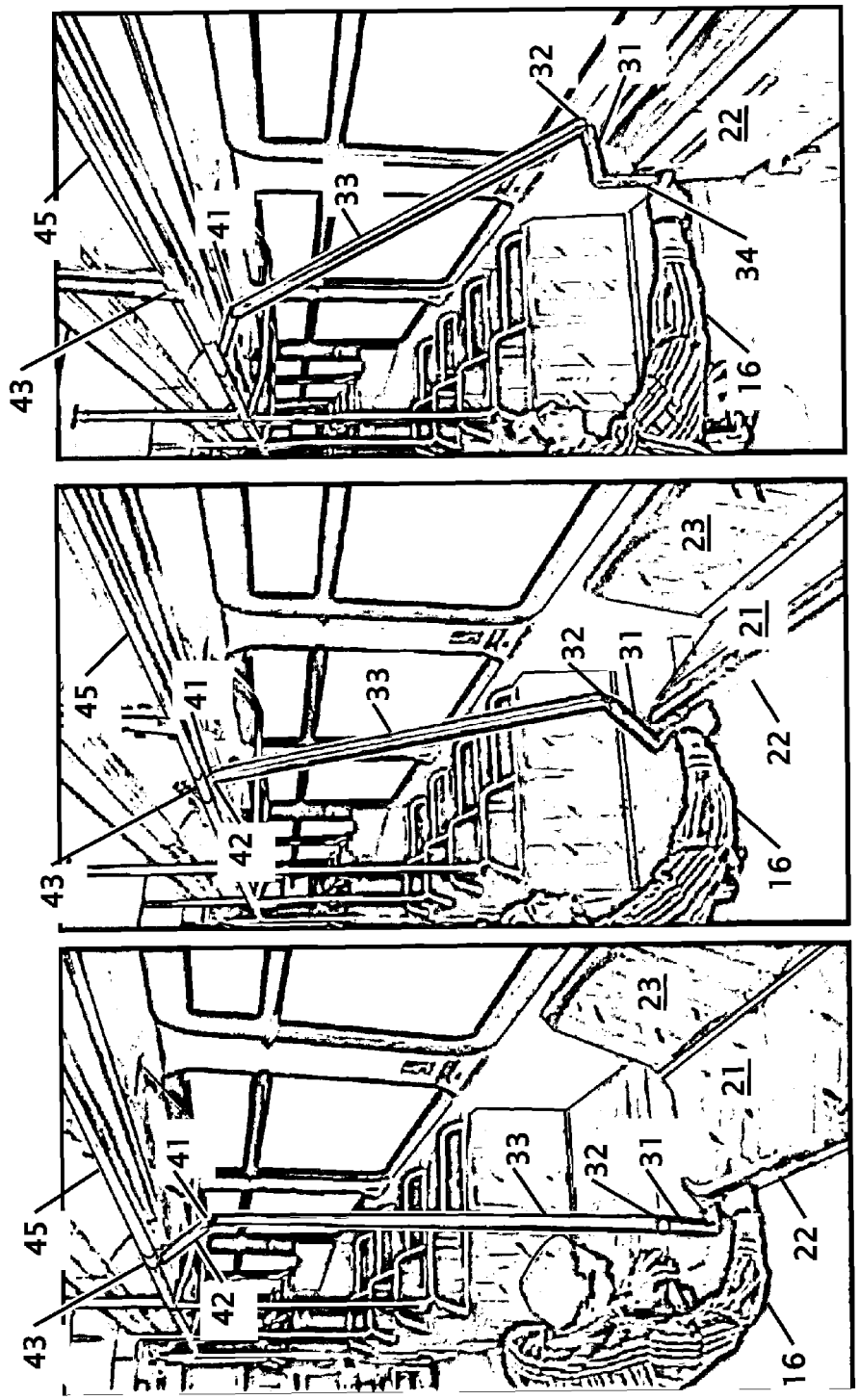

MOVEABLE STATION POLE FOR A WHEEL CHAIR POSITION IN A TRANSIT BUS

CROSS REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a movable seat with a supporting stanchion pole. More particularly, the present invention relates to a moveable stanchion pole for a wheel chair position in a transit bus that allows for a deployed bench seat with an overhead supported vertical pole, and also allows for the bench seat and pole to be folded and or rotated to allows a person with a wheel chair to occupy the same position.

2. Description of Related Art Including Information Disclosed Under 37 CFR 1.97 and 1.98

In mass transit vehicles the vehicle must accommodate different people with different needs. The need for the vehicle is to accommodate the maximum number of riders and must accommodate the needs of any handicapped people that may need to ride the vehicle. When a wheelchair is being transported the wheelchair will occupy a flat area of the bus and often the flat area is occupied by bench seats. Moving bench seat can require unbolting the seat from the floorboard. The bench seat also has at least one stanchion pole for a rider to hold for support as the bus is moving. Without removal of the chair and the pole, the chair and the pole must be either folded independently or collectively.

Due to the unique nature of the problem and the number of available similar prior art references there are a small number of similar patents. Exemplary examples of patents and or publication that try to address this/these problem(s) are identified and discussed below.

U.S. Pat. No. 4,167,285 issued on Sep. 11, 1979 for Hans Fenner et al., discloses a sidewall Structure of a Bus With Seats Mounted on the Wall. This patent is essentially just for the wall supporting structure for a seat, and does not include a vertical support pole. In addition the seat is not configured to be folded or rotated. In addition, the structure does not include a vertical stanchion pole.

U.S. Pat. No. 4,744,536 issued on May 17, 1988 for Cecil G. Bancalari discloses a Collapsible pole and stand combination. The pole can be collapsed and is adjustable for the overall length. The pole allows a person to grasp onto the pole for support as the person walks. The base of the pole has a stand with wheels that roll as a person walks with the pole. This patent does not include a seat and therefore the pole does not extend with motion of a seat.

U.S. Pat. No. 8,469,431 issued on Jun. 25, 2013 for Hakan Andersson discloses a Reconfigurable Seating Arrangement. The patent has a deployable chair that can be folded down when needed and then folded up to provide clearance. The chair is mounted onto the back of a wheelchair. This patent does not have a vertically extending pole that supports the seat from above the seat.

What is needed is a pole and seat combination where the seat rotates from the back of the seat, and as the seat rotates the stanchion pole must also rotate to clear the area to make space for a wheelchair.

BRIEF SUMMARY OF THE INVENTION

It is an object of the moveable stanchion pole for a wheel chair position in a transit bus to provide a connection to a seat or bench. The seat or bench is pivotable secured to a side wall of the transportation vehicle. This allows the seat to be rotated from a horizontal position for a person to sit and the seat can be rotated to provide extra clearance in the bus for storage of a wheelchair or other item.

It is an object of the moveable stanchion pole for a wheel chair position in a transit bus to have a pole that rotates and or pivots. The stanchion pole allows a person to hold onto the pole while they are standing. When the pole is rotated the pole rotates to the side to provide clearance to the area.

It is another object of the moveable stanchion pole for a wheel chair position in a transit bus for the stanchion pole and the seat to rotate together. As the chair or bench is rotated against the wall the stanchion pole rotates with the pole to provide a clear area for a wheelchair. The stanchion pole is connected to the front of the chair and lifts the stanchion pole as the chair is rotated. This requires the stanchion pole to both hinge and rotate with the bench.

It is still another object of the moveable stanchion pole for a wheel chair position in a transit bus to clear the occupied space of the seat and stanchion pole to allow for a wheelchair to occupy the same place where the chair previously existed.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 2 shows a first position of a moveable stanchion pole for a wheel chair position in a transit bus.

FIG. 3 shows a transitional position of a moveable stanchion pole for a wheel chair position in a transit bus.

FIG. 4 shows a second position of a moveable stanchion pole for a wheel chair position in a transit bus.

DETAILED DESCRIPTION OF THE INVENTION

Figure 1:
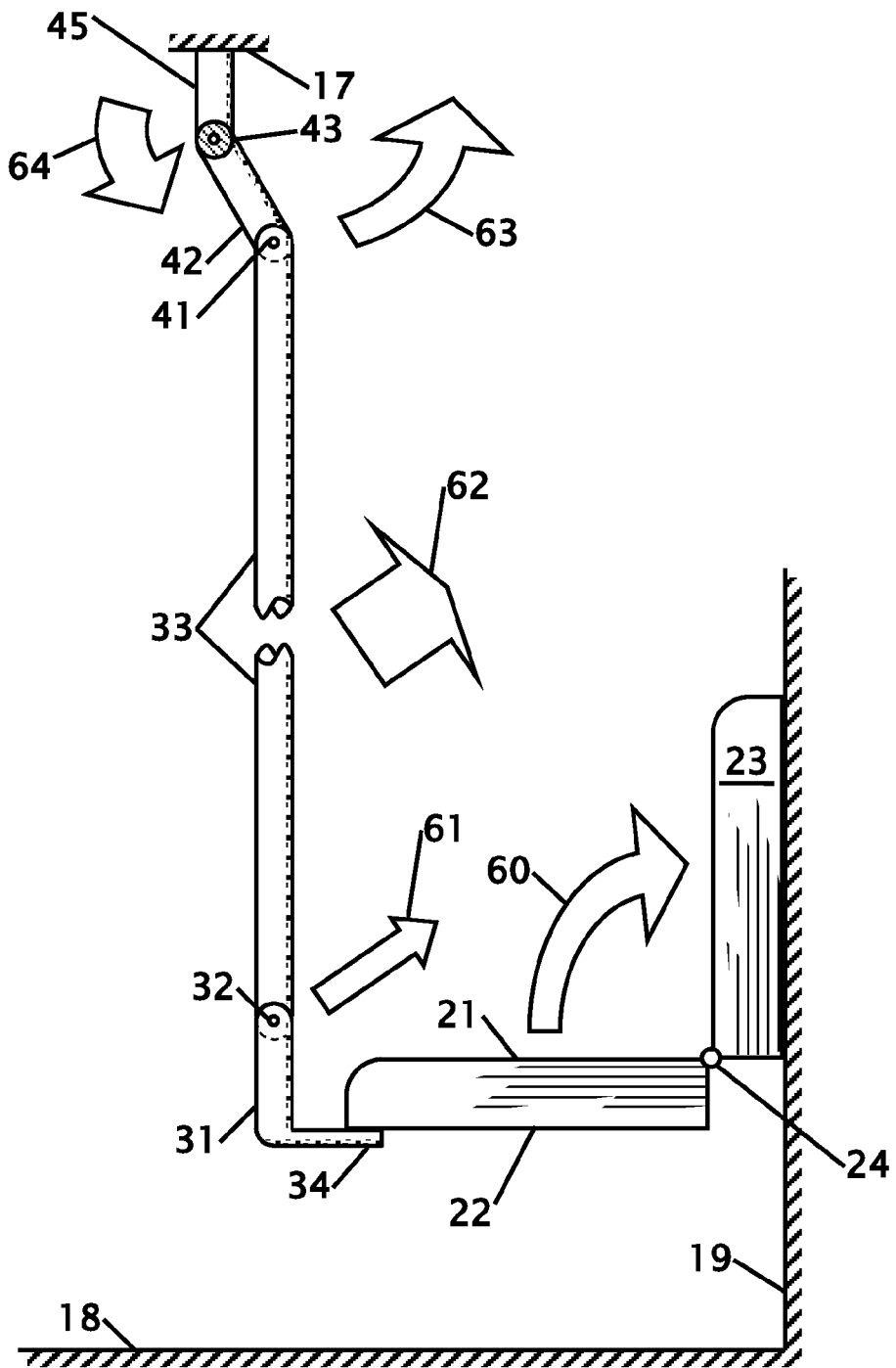
FIG. 1 shows a preferred embodiment of the elements if the moveable stanchion pole for a wheel chair position.

FIG. 1 shows a preferred embodiment of the elements if the moveable stanchion pole for a wheel chair position. This figure shows the essential pieces of the movable stanchion pole installed on a transit bus. The transit bus has a floor 18 that extends essentially parallel to the bus. The location of the stanchion pole is typically placed adjacent to a door of the transit bus. The location near the door allows for a person in a wheelchair to have minimal travel into or through the bus. This figure shows the seat 21 in a horizontal position where the seat 21 can be used by one or more people. This is essentially a normal position.

A pivoting hinge 24 exists at the back of the chair or bench 21 to provide support of the seat from a wall 19 of the bus. In this embodiment the pivot hinge 24 is shown mounted to the backrest 23, but could also be mounted directly to the side wall 19. It is further contemplated that the bench 21 can be mounted to another back-facing seat that is placed horizontal or parallel with the body of the bus.

The bottom 22 of the seat 21 has a mounting 34 for an "L" arm. The arm has a vertical element 31. The vertical element connects to a pivot point 32. The pivot hinges in a parallel arrangement with the seat pivot 24. The pivot point 32 connects to the normally vertical oriented stanchion pole 33. The stanchion pole 33 extends to a second pivot connection 41. The second pivot connection 41 is also essentially parallel to the first pivot connection 32 and the chair pivot 24. The second pivot 41 is connected to an upper riser arm 42 that joins with a pivotal connection to a cross pole pivot 43.

The cross pole pivot 43 typically extends along the majority of the entire length or width of a transit bus or similar vehicle. The cross pole pivot 43 is connected to the ceiling 17 at one or more locations. The cross pole pivot 43 is just a portion of the overhead pole and the section of the cross pole pivot 43 pivots of the overhead pole. The seat 21 is essentially supported solely from the hinge 24 and from the overhead connection to the riser 45 that connects to the ceiling 17.

To provide clearance for a wheelchair the seat 21 is lifted from either the bottom of the chair 22, the elbow 34, 31 or by lifting the stanchion pole 33. When any of these components are elevated the chair or bench 21 rotates 60 towards the backrest 23. This causes the pivot 32 to rotate/move 61 with the chair 21. The pivot 32 moves 62 the stanchion pole 33 and further rotates/lifts 63 the upper pivot 41 and rotates the upper riser arm 42 on the cross pole pivot 43 thereby making it pivot 64.

FIG. 2 shows a first position of a moveable stanchion pole 33 for a wheel chair position in a transit bus. In this figure the seat 21 allows for one or more people to occupy the space and allows for storage under the seat 21. To move the seat 21 to allow for a person in a wheelchair to occupy the area of the seat 21, an operator 16 simply lifts the front of the seat 21. The elbows 32 and 41 bend as the chair 21 is being moved. The elbows 32 and 41 are designed to reduce or eliminate pinchpoints that can cause harm as the elbows pivot. Pushing in on the stanchion pole 33.

FIG. 3 shows a transitional position of a moveable stanchion pole 33 for a wheel chair position in a transit bus. In this figure, the seat is shown in a transition position and the stanchion pole 33 is in a non-vertical orientation. The seat 21 is also in transition with the elbows 32 and 41 bending in the transition.

FIG. 4 shows a second position of a moveable stanchion pole 33 for a wheel chair position in a transit bus. In this figure the seat 22 is essentially folded against the back member or the side of the bus. The stanchion pole 33 is no longer in a vertical orientation and provides clearance for a wheelchair, bicycle or luggage.

Figure 5:
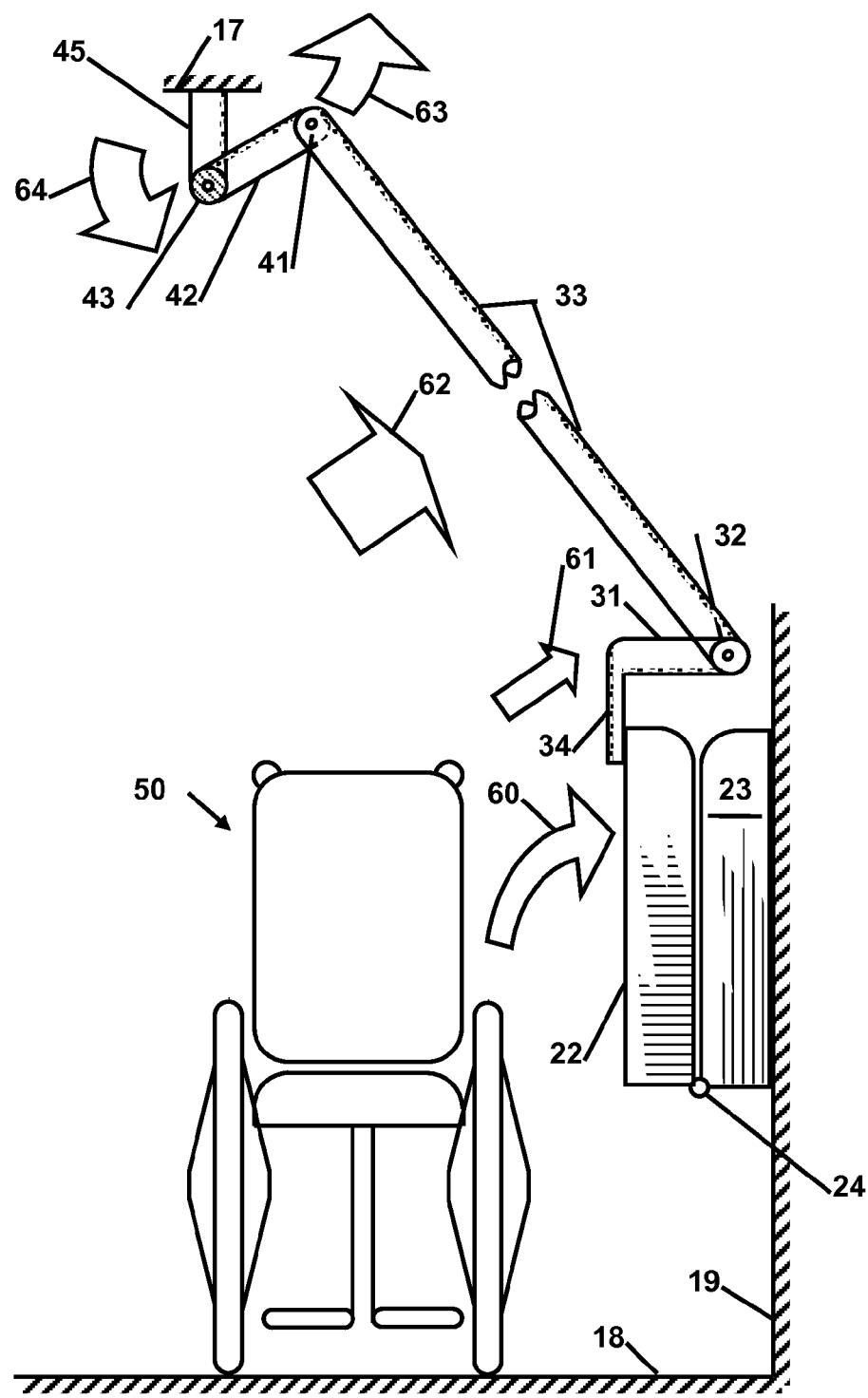
FIG. 5 shows the seat in a fully rotated position with a wheelchair occupying an area where the seat originally occupied.

FIG. 5 shows the seat 22 in a fully rotated position with a wheelchair 50 occupying an area where the seat originally occupied. The moveable stanchion pole for a wheelchair position includes a seat 22 that exists essentially in two. In the first position for the seat 22 is a horizontal surface (as shown in FIG. 1) that allows at least one person to sit. This would be a normal orientation that allows or people without physical limitations to occupy the seat. The seat 22 can also be positioned in a second position for the seat 22 that is a rotated position that provides at least some additional space for a wheelchair. While the seat 22 is shown rotating from a hinge or pivot location 24, it is also contemplated that the seat 22. Can slide or move within a track from the first position to the second position.

A stanchion pole 33 is connected to the seat 22 to allow for a standing person to hold onto the pole 33. The stanchion pole 33 has a normal position that exists in a linear position from a position above the seat 22 that connect to the seat 22 wherein the seat exists as a seating orientation. The stanchion pole 33 can also exist at least a second position wherein the seat 22 is rotated and the stanchion pole 33 is not in an essentially vertical position as shown in this figure. While this image shows the pole 33 solely in a rotated orientation, some or all of the stanchion pole 33 can telescope or bend in other orientations that are not shown in this figure without altering the making space available for a wheelchair or bicycle.

This figure shows that the stanchion pole 33 has at least one pivotal element 32, and this figure the stanchion pole 33 has at least two pivotal elements 32, and 41. The stanchion pole 33 is connected to a horizontal pole 43. The stanchion pole 33 rotates 64 with at least a portion of the horizontal pole 43 that is connected to an overhead 45 connection to the roof, ceiling or similar stable element 17. The seat 22 and stanchion pole 33 is essentially mounted to a ceiling point 45 contact and a horizontal ray 24 contact to create essentially three securing stable locations. While the seat is shown and described as being installed in a vehicle or more specifically in a transit vehicle such as a bus, it is also contemplated that the seat 22 and stanchion pole 33 could be located in a non-moving structure such as a house or building where the seat 22 is connected to an overhead connection location above the seat 22 to provide for a vertical pole. The hinge 24 provides support for the seat and prevents over rotation of the seat 22 beyond an essentially horizontal orientation.

The seat 22 is hinged 24 on a side opposing the stanchion pole 33 on to a wall 19 structure or similar structure that retains the hinge 24. In the preferred embodiment the seat 22 is an elongated bench. In the preferred embodiment the seat or chair 22 is cushioned for comfort but could be a ridged hard seat. In the preferred embodiment the seat 22 further includes a back support 23, but the back support is not a required element to the functional or operational elements. The seat essentially folds against the back support in the embodiment shown in this figure.

The connection from the seat 22 to the stanchion pole 33 is with a connection that pivots on and elbow 31. When the seat 22 is rotated the stanchion pole 33 is articulated from a non-vertical orientation that moves the stanchion pole towards a side wall of a vehicle where said seat is mounted.

Thus, specific embodiments of a moveable stanchion pole for a wheel chair position in a transit bus have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:
1. A moveable stanchion pole for a wheelchair position comprising:
   a seat that exists essentially in two positions;

a first position for said seat wherein said first position creates a horizontal surface that allows at least one person to sit;

a second position for said seat that is a rotated position that provides at least some additional space for a wheelchair;

a stanchion pole connected to said seat;

said stanchion pole having a normal position that exists in a linear position from a position above said seat that connects to said seat wherein said seat is positioned in said first position in an orientation for sitting, and said stanchion pole exists in a second position wherein said seat is rotated and said stanchion pole is not in an essentially vertical position.

2. The moveable stanchion pole for a wheelchair position according to claim 1 wherein said stanchion pole has at least one pivotal element.

3. The moveable stanchion pole for a wheelchair position according to claim 1 wherein said seat is an elongated bench.

4. The moveable stanchion pole for a wheelchair position according to claim 1 wherein when said seat is in said second position, said seat provides clearance under said seat.

5. The moveable stanchion pole for a wheelchair position according to claim 1 wherein said seat is cushioned.

6. The moveable stanchion pole for a wheelchair position according to claim 1 wherein said stanchion pole is connected to said seat with an elbow that connects between said seat and said stanchion pole.

7. The moveable stanchion pole for a wheelchair position according to claim 6 wherein said stanchion pole pivots on said elbow.

8. The moveable stanchion pole for a wheelchair position according to claim 1 further includes a back support.

9. The moveable stanchion pole for a wheelchair position according to claim 8 wherein said seat folds against said back support in said second position.

10. The moveable stanchion pole for a wheelchair position according to claim 1 wherein said seat and said stanchion pole is mounted in a vehicle.

11. The moveable stanchion pole for a wheelchair position according to claim 10 wherein said vehicle is a transit bus.

12. The moveable stanchion pole for a wheelchair position according to claim 11 wherein said stanchion pole allows a user to grasp said stanchion pole while said vehicle is stationary or in transit.

13. The moveable stanchion pole for a wheelchair position according to claim 1 wherein said normal position for said stanchion pole is essentially vertical.

14. The moveable stanchion pole for a wheelchair position according to claim 13 wherein said stanchion pole further includes a compound hinge that transforms said stanchion pole from said normal position to an articulated non-vertical orientation.

15. The moveable stanchion pole for a wheelchair position according to claim 14 wherein said articulated non-vertical orientation moves said stanchion pole towards a side wall of a vehicle where said seat is mounted.

16. The moveable stanchion pole for a wheelchair position according to claim 1 wherein said stanchion pole has at least two pivotal elements.

17. The moveable stanchion pole for a wheelchair position according to claim 1 wherein said stanchion pole rotates with at least a portion of a horizontal pole.

18. The moveable stanchion pole for a wheelchair position according to claim 1 wherein said seat is hinged on a side opposing said stanchion pole on to a wall.

19. The moveable stanchion pole for a wheelchair position according to claim 18 wherein said hinge prevents rotation of said seat beyond an essentially horizontal orientation.

* * * * *